No. 697,671. Patented Apr. 15, 1902.
F. SCHROTTKE.
ALTERNATING CURRENT METER.
(Application filed Feb. 12, 1900.)
(No Model.)

Witnesses:
Max Zabel.
C. J. Schmidt.

Inventor.
Franz Schrottke,
By Charles A. Brown & Cragg
Attorneys.

THE NORRIS PETERS CO., PHOTO-LITHO., WASHINGTON, D. C.

UNITED STATES PATENT OFFICE.

FRANZ SCHROTTKE, OF BERLIN, GERMANY, ASSIGNOR TO SIEMENS & HALSKE ELECTRIC COMPANY OF AMERICA, OF CHICAGO, ILLINOIS, A CORPORATION OF ILLINOIS.

ALTERNATING-CURRENT METER.

SPECIFICATION forming part of Letters Patent No. 697,671, dated April 15, 1902.

Application filed February 12, 1900. Serial No. 4,930. (No model.)

*To all whom it may concern:*

Be it known that I, FRANZ SCHROTTKE, a subject of the Emperor of Germany, residing at Berlin, Germany, have invented a certain new and useful Improvement in Alternating-Current Meters, (Case No. 330,) of which the following is a full, clear, concise, and exact description, reference being had to the accompanying drawings, forming a part of this specification.

My invention relates to alternating-current meters, and has for its object the provision of an improved construction and arrangement of the circuits thereof whereby the losses of energy occasioned in the meter itself are reduced to a minimum; also, to provide a meter for accurately measuring the energy of a three-phase circuit, and more particularly the energy of a balanced multiphase system of electric distribution.

It is possible to measure the energy of a three-phase system of distribution by including the current-coil of a measuring instrument in circuit with a conductor of the system, the pressure-coil being fed by one of the pressures of the system. The objections to this method, however, are that a high tension exists between the current-coil and the pressure-coil, this being at least eighty-seven per cent. of the circuit-pressure, that the inductive effects of the pressure-coil cannot satisfactorily be overcome even with a liberal use of non-inductive resistances, and that the constant power lost in the pressure-circuit is very large.

It is the prime object of this invention so to construct and arrange the circuits of the instrument that the above objectionable features are overcome, as well as to provide for an accurate measurement of power of the system. I secure these advantages and others which will be apparent by a construction which I will now describe in detail in connection with the accompanying drawings, illustrating the application of my invention to a balanced three-phase circuit, in which—

Figure 1:
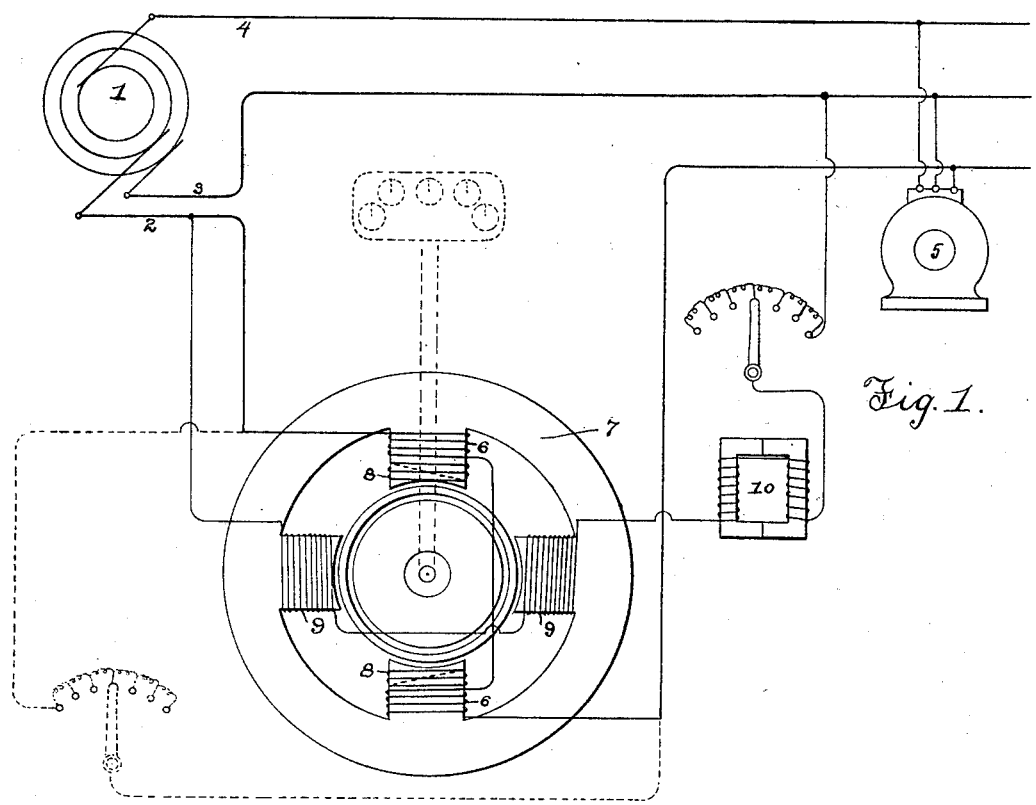
Figure 2:
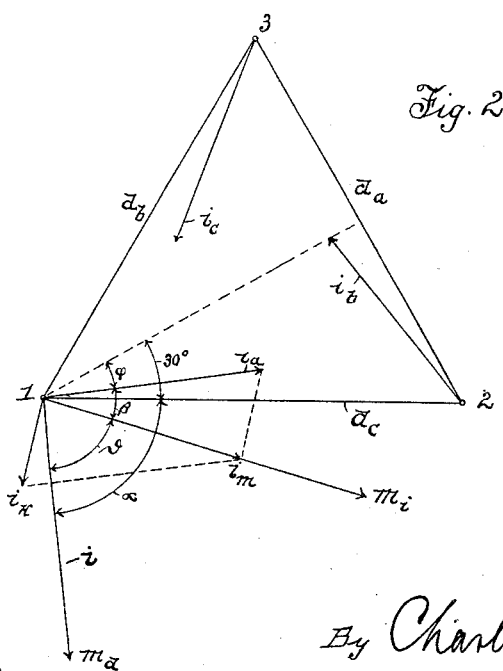

Figure 1 is a diagrammatic view of a circuit with my improved meter connected therein, and Fig. 2 is a phase and vector diagram illustrating the electrical problems involved.

Like characters of reference indicate similar parts in the two figures.

A source of power 1 is shown as supplying current to the leads 2, 3, and 4, translating devices 5 receiving current therefrom. Series field-coils 6 6 of an induction-motor 7 are included in circuit with a lead 2. Secondary coils 8 8 are placed in inductive relation to the series coils 6 6, being preferably placed upon the same pole-pieces therewith. Shunt field-coils 9 9 are preferably included in the circuit between the leads 1 and 2, an inductive reactance 10 being also included in the same circuit therewith. The three pressures $d_a$, $d_b$, $d_c$ of the system together form a closed triangle, as shown in Fig. 2. With a non-inductive loading of the circuit the three currents $i_a$, $i_b$, and $i_c$ of the system would respectively lead the pressures $d_c$, $d_a$, $d_b$ by an angle of thirty degrees; but I have shown them as leading by a much smaller angle, as reactance is almost invariably present in an alternating-current-transmission circuit.

The current $i_a$ in the current-winding 6 may be considered as being the resultant of two currents in quadrature—the current $i_k$, which is induced in the secondary coils 8, and the current $i_m$, creating the series field $m_i$—the short-circuited coil 8 serving to displace the series field from the main current by an angle $\beta$. If the inductive effects of the shunt-circuit are great enough, the shunt field-current $i$, creating the shunt-field $m_d$, will be displaced from the pressure $d_c$, impressed upon the shunt-circuit by an angle $\alpha$. If the shunt-field $m_d$ be displaced from the series field $m_i$ by an angle $\vartheta$, then the indications of the measuring element would be $$W = K\, m_i\, m_d \sin \vartheta,$$

where W denotes the work of the circuit and K some absolute constant. If the displacement of the current $i_a$ from the position it would occupy if no reactance were present in the circuit be equal to the angle $\varphi$, then the work $W_1$ of the circuit expressed in terms of the current and pressure would be $$W_1 = \sqrt{3}\, i_a\, d_c \cos \varphi.$$

The strength of field due to the currents evidently is equal to a constant multiplied by the current—i. e., $$m_i = C_1 I_a$$

and $$m_d = C_2 D_e,$$

wherein $C_1$ and $C_2$ are some arbitrary constants.

From the above we obtain by substituting for the values of the current and pressure their equivalents in terms of the fields they produce the result that $$W_1 = \sqrt{3}\, \frac{1}{C_1 C_2}\, m_i\, m_d\, \cos.\, \varphi.$$

If the former constant K be made equal to the latter constant $\frac{\sqrt{3}}{C_1 C_2}$, it is evident that in order to have the indications of the work W be equal to the indications $W_1$ that sin. $\vartheta$ must be equal to cos $\varphi$, which means that the angles $\vartheta$ and $\varphi$ must together be equal to ninety degrees. In this case the instrument would correctly indicate the energy traversing the system.

From Fig. 2 it is evident that the angle $\alpha$ plus thirty degrees is equal to the sum of the three angles $\vartheta$, $\beta$, and $\varphi$, thereby making the angle $\alpha$ equal to the sum of the angles $\beta$ and sixty degrees. It is also seen from the same figure that the value of the angle $\beta$ is given by the ratio $$\text{Sin.}\ \beta = \frac{i_k}{i_a},$$

which is constant for a given style of meter.

I preferably so arrange the pressure-circuit that the angle $\alpha$ is very nearly equal to ninety degrees, in which case the angle $\beta$ would have a value very close to thirty degrees, this being readily obtained by an adjustment of non-inductive resistance preferably placed in circuit with the secondary coil 8. It is possible, however, to give to the angle $\beta$ a predetermined value, and thus adjust the phase displacement of the shunt-current by means of an inductive resistance 10 or by other suitable means, the angle $\alpha$ being capable of having a negative displacement in some instances.

In place of the secondary coils a non-inductive shunt-circuit may also be placed around the series coils.

I have herein shown and particularly described the preferred embodiment of my invention as applied to a balanced three-phase circuit, but do not wish to limit myself to such application nor to the precise arrangement and construction shown; but,

Having thus described my invention, I claim as new and desire to secure by Letters Patent—

1. In a wattmeter for balanced three-phase systems of distribution, the combination with a movable measuring element, of a series winding inductively associated with said movable measuring element, a pressure-winding also inductively associated with said movable measuring element, and a closed-circuited secondary winding receiving its current inductively from said series winding, the magnetic field due to the said pressure-winding being displaced nearly ninety degrees from its impressed pressure, substantially as described.

2. In a wattmeter for balanced three-phase systems of distribution, the combination with a movable measuring element, of a series winding inductively associated with said movable measuring element, a pressure-winding also inductively associated with said movable measuring element, and a short-circuited secondary winding receiving its current inductively from said series winding, the magnetic field due to the said pressure-winding being displaced nearly ninety degrees from its impressed pressure, substantially as described.

3. In a wattmeter for balanced three-phase systems of distribution, the combination with a movable measuring element, of a series winding inductively associated with said movable measuring element, a pressure-winding also inductively associated with said movable measuring element, a short-circuited secondary winding receiving its current inductively from said series winding, the magnetic field due to the said pressure-winding being displaced nearly ninety degrees from its impressed pressure, and an impedance-winding in circuit with said pressure-winding, substantially as described.

4. In a balanced three-phase system of distribution, the combination with a source of current, of a wattmeter comprising a movable measuring element, a series winding inductively associated with said movable measuring element, a closed-circuited secondary winding for said series winding, and a pressure-winding also in inductive relation with said movable measuring element and receiving its current from the conductor of the system including the series winding and one of the remaining conductors, substantially as described.

5. In a balanced three-phase system of distribution, the combination with a source of current, of a wattmeter comprising a movable measuring element, a series winding inductively associated with said movable measuring element, a closed-circuited secondary winding for said series winding, a pressure-winding also in inductive relation with said movable measuring element and receiving its current from the conductor of the system including the series winding and one of the remaining conductors, and an impedance-winding in series with said pressure-winding, substantially as described.

6. In a balanced three-phase system of distribution, the combination with a source of current, of a wattmeter comprising a movable measuring element, a series winding inductively associated with said movable measuring element, means for lagging the phase of the effective magnetic field due to said series winding, and a pressure-winding also in inductive relation with said movable measuring element and receiving its current from the conductor of the system including the series winding and one of the remaining conductors, substantially as described.

In witness whereof I hereunto subscribe my name this 22d day of January, A. D. 1900.

FRANZ SCHROTTKE.

Witnesses:
 HENRY HASPER,
 WOLDEMAR HAUPT.